United States Patent
Jung et al.

(10) Patent No.: US 9,451,029 B2
(45) Date of Patent: Sep. 20, 2016

(54) METHOD OF REMOTE CONTROL FOR PORTABLE DEVICE AND SYSTEM USING THE SAME

(75) Inventors: In Hyung Jung, Gumi-si (KR); Sung Yong Kim, Gumi-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1449 days.

(21) Appl. No.: 12/476,829

(22) Filed: Jun. 2, 2009

(65) Prior Publication Data
US 2010/0022233 A1 Jan. 28, 2010

(30) Foreign Application Priority Data
Jul. 23, 2008 (KR) .......................... 10-2008-0071779

(51) Int. Cl.
*H04L 29/08* (2006.01)
*H04M 3/42* (2006.01)
*H04M 7/00* (2006.01)

(52) U.S. Cl.
CPC .............. *H04L 67/125* (2013.01); *H04M 3/42* (2013.01); *H04M 7/006* (2013.01); *H04M 2203/1016* (2013.01); *H04M 2207/18* (2013.01)

(58) Field of Classification Search
None
See application file for complete search history.

(56) References Cited

U.S. PATENT DOCUMENTS

| | | | |
|---|---|---|---|
| 5,909,545 A * | 6/1999 | Frese et al. | 709/208 |
| 6,250,557 B1 * | 6/2001 | Forslund | G06K 17/0022 235/375 |
| 6,633,759 B1 * | 10/2003 | Kobayashi | 455/419 |
| 7,356,046 B2 * | 4/2008 | Harley, Jr. | 370/466 |
| 7,613,453 B2 * | 11/2009 | Hassan et al. | 455/418 |
| 7,620,707 B1 * | 11/2009 | Sutherland et al. | 709/223 |
| 7,716,286 B2 * | 5/2010 | Heins et al. | 709/204 |
| 8,141,135 B2 * | 3/2012 | Nagami et al. | 726/5 |
| 8,892,087 B2 * | 11/2014 | Ackley | 455/420 |
| 2006/0099977 A1 * | 5/2006 | Lai | H04M 1/72552 455/466 |
| 2006/0111131 A1 | 5/2006 | Shin et al. | |
| 2006/0176884 A1 * | 8/2006 | Fair et al. | 370/400 |
| 2007/0178891 A1 * | 8/2007 | Louch et al. | 455/420 |
| 2007/0199065 A1 * | 8/2007 | Ogawa et al. | 726/15 |
| 2007/0259657 A1 * | 11/2007 | Cheng | 455/419 |
| 2008/0039062 A1 * | 2/2008 | Laursen et al. | 455/419 |
| 2009/0036111 A1 * | 2/2009 | Danford et al. | 455/419 |
| 2009/0077184 A1 * | 3/2009 | Brewer et al. | 709/206 |

FOREIGN PATENT DOCUMENTS

| | | |
|---|---|---|
| KR | 10-2006-0056744 A | 5/2006 |
| KR | 10-2006-0122630 A | 11/2006 |
| KR | 10-2007-0010637 A | 1/2007 |

* cited by examiner

*Primary Examiner* — Hassan Kizou
*Assistant Examiner* — Roberta A Shand
(74) *Attorney, Agent, or Firm* — Jefferson IP Law, LLP

(57) ABSTRACT

A portable device remote control method and system are provided. The method includes registering an Internet Protocol (IP) address in an IP network, by a portable device, forming a transport control protocol based communications channel with the portable device based on the IP network and the IP address, by an internet access terminal, transmitting a control signal for activating an application program of the portable device by using the transport control protocol based communications channel, by the internet access terminal, activating the application program according to the control signal, by the portable device, and receiving screen information according to the activated application program from the portable device by using the transport control based communication system, and outputting the received screen information, by the internet access terminal.

15 Claims, 8 Drawing Sheets

METHOD OF REMOTE CONTROL FOR PORTABLE DEVICE AND SYSTEM USING THE SAME

PRIORITY

This application claims the benefit under 35 U.S.C. §119 (a) of a Korean patent application filed in the Korean Intellectual Property Office on Jul. 23, 2008 and assigned Serial No. 10-2008-0071779, the entire disclosure of which is hereby incorporated by reference.

BACKGROUND OF THE INVENTION

1. Field of the Invention

The present invention relates to a method of remote control for a portable device and system using the same. More particularly, the present invention relates to a method and system for remotely controlling an Internet Protocol (IP) network based portable device.

2. Description of the Related Art

A portable device is an apparatus for transmitting and receiving a voice or a message with another portable device, after forming a communication channel with the other portable device through a base station of a mobile communication network. In recent developments in technology, the portable device can be manufactured to be thin and light so that it can fully satisfy portability. Accordingly, the use of the portable device in the mobile communication network has developed into a value-added product while attracting many subscribers in a short time.

A service provider providing the mobile communication network provides limited usage flexibility of the portable device in a different service area. That is, the portable device joining a first service provider cannot use a specific mobile communication network that a second service provider provides. The limited use of the service area is applied to the portable device located in the same area of the service provider. In addition, the limited use is identically applied to the service area where the service provider is changed. In other words, when a user of the portable device joins the first service provider and uses the mobile communications service, if the user leaves the first service provider service area and moves into another service area that the second service provider administers, the user of portable device cannot use the mobile communications service.

In order to solve such a problem, a roaming service providing method was suggested, in which a communications service agreement between the first service provider and the second service provider is provided so that the mobile communications service can be used regardless of the area change. However, the roaming service providing method has a problem which requires paying additional costs since the user of portable device substantially uses both the mobile telecommunications network of the first service provider and the mobile telecommunications network of the second service provider. To solve the additional costs problem, a method for applying a discount rate between the service providers has been suggested. However, an increment of the cost of using the mobile telecommunications network is still generated. Moreover, a problem may also exits with additional costs if the user of the portable device joining the first service provider rents an additional portable device in order to use the mobile telecommunications network of the second service provider, or purchases a portable device which can use both the mobile telecommunications network of the first service provider and the mobile telecommunications network of the second service provider.

Therefore, a need exists for a remote control method and system for a portable device without using an additional portable device and acquiring additional costs.

SUMMARY OF THE INVENTION

An aspect of the present invention is to address at least the above-mentioned problems and/or disadvantages and to provide at least the advantages described below. Accordingly, an aspect of the present invention is to provide a portable device remote control method and system for remotely controlling its own portable device.

In accordance with an aspect of the present invention, a method of remote control for a portable device is provided. The device includes registering an Internet Protocol (IP) address in an IP network, by a portable device, forming a transport control protocol based communications channel with the portable device based on the IP network and the IP address, by an internet access terminal, transmitting a control signal for activating an application program of the portable device by using the transport control protocol based communications channel, by the internet access terminal, activating the application program according to the control signal, by the portable device, and receiving screen information according to the activated application program from the portable device by using the transport control protocol based communications channel, and outputting the received screen information, by the internet access terminal.

In accordance with another aspect of the present invention, a remote control system of a portable device is provided. The system includes an Internet Protocol (IP) network for supporting an IP based communications channel, a portable device for registering an IP address in the IP network, and an internet access terminal for forming a transport control protocol communications channel with the portable device based on the IP network, wherein the internet access terminal transmits a signal for activating the portable device, and receives and outputs screen information which is generated accordingly.

The portable device remote control method and system according to an exemplary embodiment of the present invention can remote control its own portable device without an additional portable device and is able to use various services of the portable device without acquiring additional costs.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
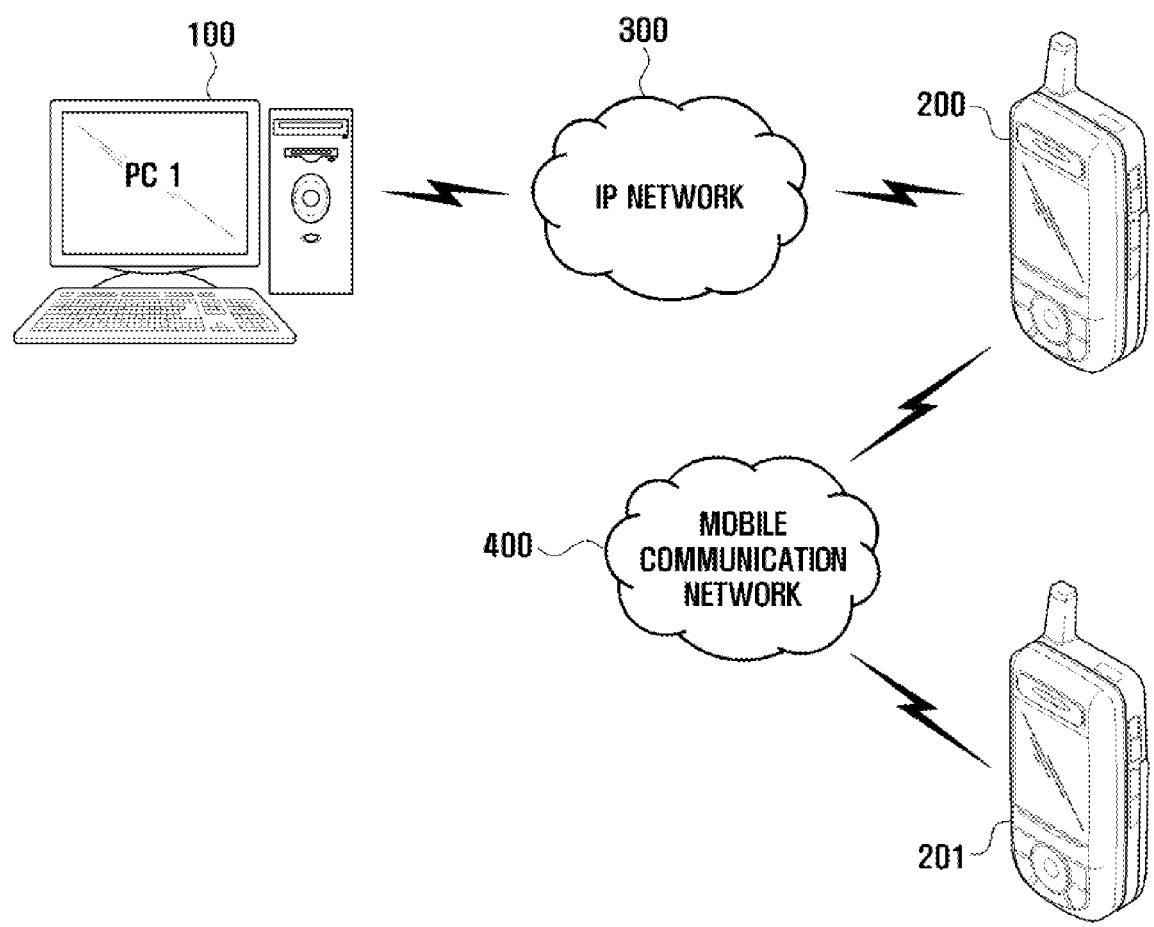
FIG. 1 schematically illustrates a configuration of a portable device remote control system according to an exemplary embodiment of the present invention.

FIG. 1 schematically illustrates a configuration of a portable device remote control system according to an exemplary embodiment of the present invention;

Referring to FIG. 1, the portable device remote control system includes an internet access terminal 100, an Internet Protocol (IP) network 300, a portable device 200 and a mobile communication network 400. When the internet access terminal 100 accesses the IP network 300 and searches for the portable device 200, the portable device remote control system supports the internet access terminal 100 to use various services of the portable device 200 based on the portable device 200 that is found during the search.

The internet access terminal 100 includes an application program for remotely operating the portable device 200. The portable device 200 includes a communications module accessible to the IP network 300, and registers a unique address, that is, a static IP address, which enables the portable device 200 to be located in the IP network 300. The internet access terminal 100 is a terminal for accessing the IP network 300, and may include a modem, a wireless and a wired Radio Access Network (RAN) and the like. After entering the IP network 300, the internet access terminal 100 searches the portable device 200 through a name service server which stores information related to the portable device 200.

When the searching in the portable device 200 is completed, the internet access terminal 100 forms a Transport Control Protocol (TCP) communications channel with the portable device 200 after performing an authentication procedure with the corresponding portable device 200. Thereafter, the internet access terminal 100 may operate the application program for control of the portable device 200. When the application program operation is performed, the internet access terminal 100 may perform an instrument control, a message service control and a call service control of the portable device 200. That is, the internet access terminal 100 requests screen information of a screen to the portable device 200 and may output the screen information displayed on the screen of the portable device 200 to a Personal Computer (PC) display unit.

Accordingly, the internet access terminal 100 transmits various control signals to the portable device 200 for control of the portable device 200 while outputting substantially the same screen as the portable device 200 screen. After receiving the various control signals from the internet access terminal 100, the portable device 200 performs an operation according to a corresponding control signal, and may transmit data generated according to corresponding screen information and operation to the internet access terminal 100.

The IP network 300 provides a network apparatus to which the internet access terminal 100 may access, and a network apparatus to which the portable device 200 may access. That is, the IP network 300 may provide a wireless and wired Access Point (AP) to which the internet access terminal 100 may access, and may provide the RAN or the AP to which the portable device 200 may access. The IP network 300 builds a server which provides a name service managing the IP address of portable device 200 and may support the internet access terminal 100 to find the portable device 200. For example, the name service server included in the IP network 300 may have an index of the portable device 200, for example, a telephone number or a name, and IP addresses which are mapped to the telephone number or the name, in the form of a mapping table. When the name service server tries to perform a search related to a specific portable device 200 in the name service server, after the internet access terminal 100 accesses the IP network 300, the name service server may provide the IP address of the specific portable device 200 by using the IP address mapped to the telephone number or the name which is input by the internet access terminal 100. When location confirmation of the portable device 200 is completed, the IP network 300 may provide a physical and a logical path to form a TCP communications channel between the internet access terminal 100 and the portable device 200.

When the TCP communications channel is formed, by using the above-described communications channel, the IP network 300 performs transmission of signals, for example, a instrument control and a screen information transceive signal according to the instrument control, a signal for supporting a message service, and a signal for supporting a call service, transceived between the internet access terminal 100 and the portable device 200.

The portable device 200 includes a communications module accessible to the IP network 300, and may have a unique IP address. The portable device 200 may enter the IP network 300 and register its own unique IP address in the name service server. Thereafter, if the internet access terminal 100 searches the portable device 200, the portable device 200 creates its own IP address to be confirmed by the internet access terminal 100 according to a query of the name service server. The portable device 200 then performs an authentication procedure with the internet access terminal 100. After an appropriate authentication procedure is completed, the portable device 200 operates correspondingly to the instrument control application program of the internet access terminal 100. That is, the portable device 200 may perform the screen information that the internet access terminal 100 requests, the message service function, the call service function and the like.

Here, the message service may include the transmission of messages stored in a reception message inbox to the internet access terminal, or the transmission of a message write window for transmitting a message prepared by the internet access terminal to another portable device 201 to the internet access terminal. According to the request of the internet access terminal 100, the portable device 200 may form the mobile communications channel with the other portable device 201 through the mobile communication network 400.

The mobile communication network 400 may include a base station, a base station controller for controlling the base station, and a mobile switching center that switches a signal that the base station controller transmitted in order to form a communications channel with the portable device 200 and the other portable device 201. The mobile communication network 400 includes a message service center for the message service support of the portable device 200, and transmits a message that the other portable device 201 transmitted to the portable device 200. The mobile communication network 400 forms a voice communications channel or an image communications channel between the portable device 200 and the other portable device 201, and may function to transmit signals transceived between the portable devices.

As described above, the remote control system of the portable device according to an exemplary embodiment of the present invention performs the instrument control between the internet access terminal and the portable device based on the IP network, while being able to support the message service function and the call service function of the portable device based on the mobile communication network. Hereinafter, each configuration of the internet access terminal of the portable device remote control system will be described below in more detail.

Figure 2:
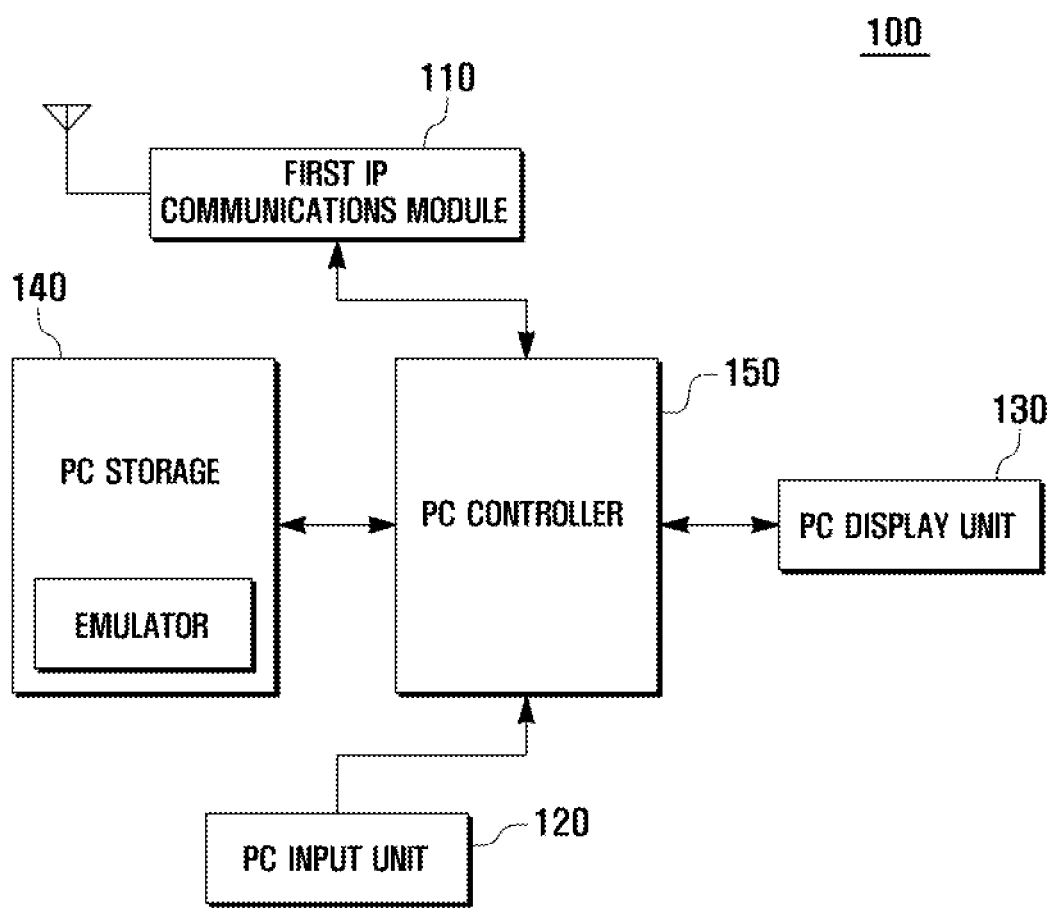
FIG. 2 is a block diagram schematically illustrating a configuration of an internet access terminal of a portable device remote control system according to an exemplary embodiment of the present invention.

FIG. 2 is a block diagram schematically illustrating a configuration of an internet access terminal of a portable device remote control system according to an exemplary embodiment of the present invention.

Hereinafter, the internet access terminal will be illustrated as a PC terminal. Here, the internet access terminal may be a PC terminal and a terminal may be accessible to the internet. Exemplary PC terminals include various communications devices, such as a notebook, PDA and the like.

The internet access terminal may include a first input unit, a first display unit, a first controller, a first IP communications module and a first storage. Hereinafter, the first input unit will be illustrated as a PC input unit, the first display unit as a PC display unit, the first storage as a PC storage, and the first controller as a PC controller.

Referring to FIG. 2, the internet access terminal 100 includes a first IP communications module 110, a PC input unit 120, a PC display unit 130, a PC storage 140 and a PC controller 150. The internet access terminal 100 may further include a microphone (not illustrated) which may collect a voice signal of a user of the internet access terminal 100 and a neighboring audio signal, and a speaker (not illustrated) which may output the voice signal that the portable device transmits.

The microphone and the speaker may perform the function of a voice signal collection and a voice signal output during a process where the internet access terminal 100 controls the portable device to use a call service with the portable device. The internet access terminal 100 forms a communications channel with the portable device by transmitting a signal that may search for the portable device based on the first IP communications module 110, and may perform an instrument control of the portable device by using an emulator stored in the PC storage 140. Hereinafter, each configuration of the internet access terminal 100 will be described in more detail. The first IP communications module 110 may be a network apparatus that the IP network provides, for example, an IP wireless communications module and a wired IP communications module that may communicate with the AP.

That is, the first IP communications module 110 may be a modem in the form of a wireless Local Area Network (LAN) card or a wired LAN card. The first IP communications module 110 forms a TCP communications channel with the portable device through the IP network, transmits authentication information, transmits a portable device control signal under control of the PC controller 150, and receives and transmits a signal corresponding to screen information and a message or the voice signal from the portable device to the PC controller 150. The PC input unit 120 includes a plurality of input keys and function keys for receiving number or character information from a user and setting various functions. The function keys may include a direction key and a side key which are set in order to perform a specific function. Moreover, the PC input unit 120 generates a key signal corresponding to a user setting and an internet access terminal function control to transmit to the PC controller 150.

More particularly, the PC input unit 120 generates an input signal for connecting to the IP network according to the user's input, an IDentification (ID) and password input signal required for an authentication procedure for the portable device, an input signal for the instrument control of the portable device, an input signal for the use of message service and an input signal for the use of call service, and transmits the input signals to the PC controller 150. The above-described PC input unit 120 may be implemented in the form of a keyboard, a keypad and a touch pad, and may be in the form of an input unit based on voice recognition. The PC display unit 130 may output various screens according to the performing of the function of the internet access terminal 100. That is, the PC display unit 130 displays information which the user input or information provided for the user according to a use of programs, as well as displays menu. That is, the PC display unit 130 may output various screens according to the use of the internet access terminal, for example, a stand-by screen where an icon is displayed, a menu screen according to the activation of a window key, and a screen according to activation of a specific program. More particularly, the PC display unit 130 connects to the IP network and may output a search screen for the search of the portable device, a screen for performing authentication with the searched portable device, an emulator activation screen for control of the portable device, a screen of the portable device received from the portable device, a message writing screen and a screen according to the use of the call service.

Here, the PC display unit 130 may output a screen which is identical to the screen output to the display unit of the portable device, such as, a stand-by screen transmitted from the portable device according to the driving of the emulator, a message writing screen and a call service screen. The PC storage 140 semi-permanently stores an application program for a booting operation and an operation of the internet access terminal 100, various application programs which are operated based on the internet access terminal 100, and data generated according to the operation of the above-described application programs. The PC storage 140 may include a hard drive, a Random Access Memory (RAM), a cache memory and the like. The hard drive stores a code source of a wide range application programs relating to the internet access terminal 100, and stores data generated according to the operation of the above-described application programs. The hard drive may be logically classified into a program area which stores a program such as an Operation System (OS), and a data area which stores various content of a moving picture, static images, text and the like, for example, movies, music, photographs, posters, news, documents and the like.

The RAM is a memory where a basic program for control of an Input and Output (I/O) unit of the internet access terminal 100 resides for a fast operation of the internet access terminal 100. The above described basic program and data are temporarily loaded for fast data processing in reading and writing various application programs data stored in the hard drive. In the process of transceiving data through the IP network, the RAM may function as a buffer. Among RAMs, the cache memory is a memory which loads data which are most frequently fetched.

In an exemplary implementation, the PC storage 140 is classified into a hard drive, a RAM and a cache memory. However, the PC storage 140 may be logically classified after at least two configurations are physically implemented with one memory. The PC storage 140 may include an emulator for control of the portable device. The emulator is a program which may remotely control the portable device, and may transmit a control signal for control of the portable device through the IP network. The emulator may also output a signal received from the portable device. The internet access terminal and the portable device may use a similar operating system. However, the portable device which has many limitations in manufacturing the implementation of an instrument may use an operating system different from the internet access terminal. The communications method between the instruments of the portable device may be different from the internet access terminal.

Accordingly, for control of the portable device, the internet access terminal 100 requires an emulator which may generate a control signal. The control signal may be in common use within the portable device and may transmit to the portable device. That is, the emulator may function as a translator which may transmit the signal generated in the internet access terminal to the portable device, and may output the signal received from the portable device in the internet access terminal.

In the meantime, according to control of the portable device and the use of a portable device service, the PC storage 140 may store various data that the portable device transmitted, for example, various information that are stored in the phone book, a message received from another portable device, and a call log, such as an absence call. Here, the internet access terminal may be a terminal installed at an internet cafe or an exclusive PC room. Therefore, the information for storing is confirmed by a terminal user before storing the above-described various data transmitted. When power is supplied to the internet access terminal 100, the PC controller 150 controls the booting process of the terminal and the output of a preset startup program and the stand-by screen. The PC controller 150 controls the signal flows between each configuration of the internet access terminal 100, and controls such that the internet access terminal 100 operates according to the request of the user.

More particularly, according to the input of the user, the PC controller 150 may control the communications channel formation with the portable device, the portable device instrument control, the portable device based message service use control and the portable device based call service use control. In more detail, if the terminal user transmits an input signal for the search of the portable device 200 by using an input unit, then the PC controller 150 attempts to access the IP network by using the first IP communications module 110. If the access to the IP network is completed, the PC controller 150 may request the search of the portable device to the IP network.

At this time, the PC controller 150 transmits portable device information which the user input, for example, a telephone number or a name, to the IP network. The IP network requests the name service server to determine whether a portable device having the IP address that matched the telephone number name which the internet access terminal 100 transmitted exists. If the corresponding portable device exists, the PC controller 150 may form a TCP based communications channel with the portable device by using the first IP communications module 110. In this process, the PC controller 150 may perform an authentication procedure with the portable device. If the authentication procedure is completed, the PC controller 150 may control to perform synchronization with the portable device, after the emulator stored in the PC storage 140 is activated. That is, by using the emulator, the PC controller 150 may request screen information which is output to the present screen of the portable device, and may control to output the received screen information based on the emulator.

The PC controller 150 may control to transmit the input signal which the user input to the portable device. When the portable device transmits the screen information according to the operation process according to the received input signal, the PC controller 150 may control to output the screen information to the PC display unit 130. For example, if the PC input unit 120 transmits an input signal which selects a menu selection and opens the phone book, or a menu selection and opens the calling list, the PC controller 150 transmits the input signal to the portable device. Thereafter, if the portable device transmits the information of the screen which operates according to the above-described input signal, the PC controller 150 may control to receive the information of the screen and output the information of the screen to the PC display unit 130.

In the meantime, if an input signal for the use of the message service is transmitted from the PC input unit 120, the PC controller 150 transmits a signal for the use of the message service to the portable device. If the portable device transmits the screen information of a message service menu item, the PC controller 150 controls to output the screen information to the PC display unit 130. In this process, the PC controller 150 receives a signal from the PC input unit 120 for selecting the reception message inbox in the screen information which the portable device transmits, a signal for confirming a reception message list included in the reception message inbox and a signal for confirming a specific reception message confirmation among the reception message list, and transmits the signals to the portable device 200. Accordingly, the portable device transmits the screen information corresponding to the reception message inbox, the reception message list and the specific reception message confirmation. The PC controller 150 may control to output the received screen information to the PC display unit 130, respectively. In the meantime, if an input signal corresponding to the selection of item for message writing is input from the PC input unit 120, the PC controller 150 transmits the signal to the portable device, and controls such that if the portable device transmits the screen information which activates the message writing window, the signal is output to the PC display unit 130.

If the PC controller 150 receives the message input and the input of a telephone number for receiving a message from the PC input unit 120, while the screen information of the message writing window is output, the PC controller transmits a corresponding message and telephone number to the portable device. The PC controller may control such that the screen information of the corresponding message transmission is received from the portable device and output to the PC display unit 130. Moreover, the PC controller 150 may use items included in the message service menu item, for example, various menu items including a group message transmission, a multimedia message service transmission by using a multimedia file stored in a storage of the portable device, and a message usage record, based on the TCP communications channel connected to the portable device.

Moreover, if the PC controller 150 receives a telephone number and a call request signal from the PC input unit 120, the telephone number and the call request signal may be transmitted to the portable device. Then, the PC controller 150 may receive a voice signal received from the other portable device corresponding to the input telephone number and the communication channel connected based on the mobile communication network. The PC controller 150 may transmit through device the voice signal input from the PC input unit 120 to the other portable device. Consequently, the PC controller 150 may form a voice traffic channel with the other portable device through the IP network, the portable device and the mobile communication network.

In a method for writing a telephone number, the PC controller 150 requests from the portable device to receive the phone book information or the calling list information, and forms a voice traffic channel based on a specific telephone number selected by the PC input unit 120, after outputting the received information to the PC display unit 130. Here, if the internet access terminal 100 includes an image collecting device, such as a camera or camcorder, the PC controller 150 performs image communications with the other portable device through the IP network and the mobile communication network. As described above, the internet access terminal 100 searches the portable device by using the IP network based internet which does not require additional cost for the use of communications service, and may use various services of the portable device based on the instrument control of the portable device.

Here, the portable device may prepare a second IP communications module, a second display unit, a second controller, a second storage and a cable interface. Corresponding to the configuration of the internet access terminal, the second display unit is denoted as a terminal display unit, the second controller is denoted as a terminal controller and the second storage is denoted as a terminal storage.

Figure 3:
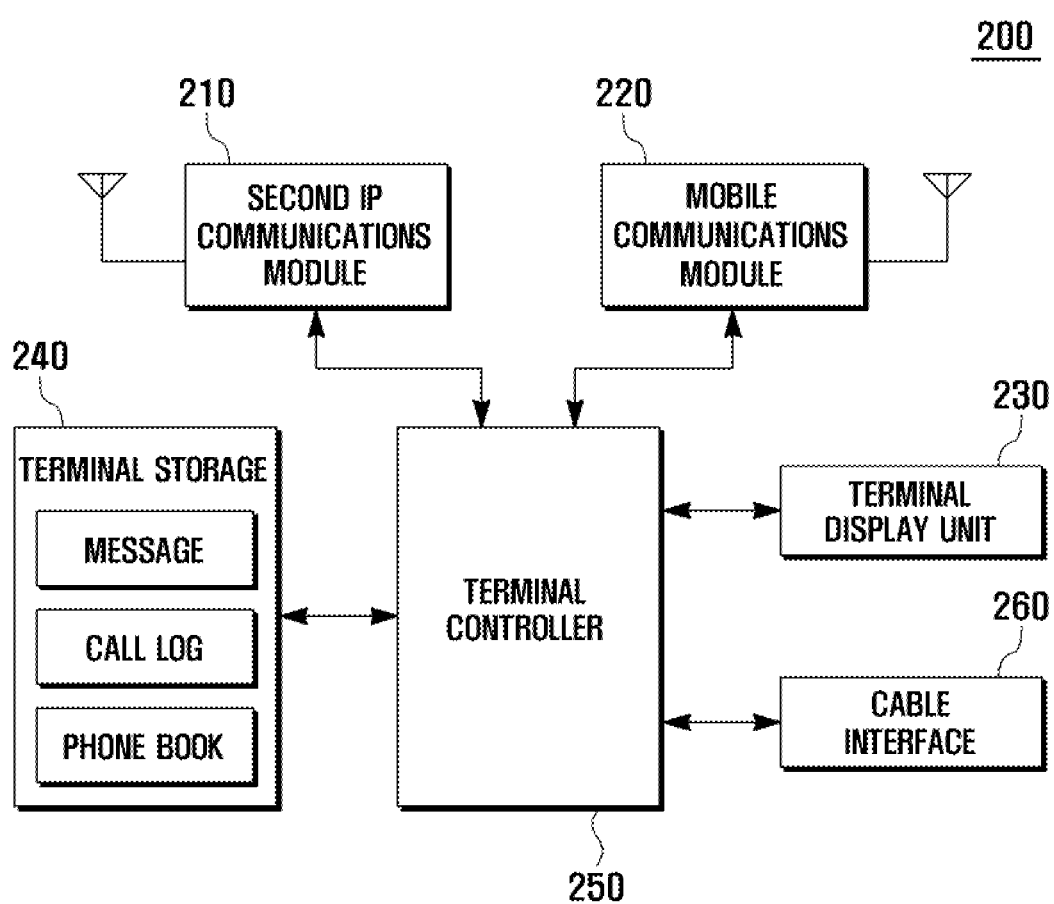
FIG. 3 is a block diagram schematically illustrating a configuration of a portable device of a portable device remote control system according to an exemplary embodiment of the present invention.

FIG. 3 is a block diagram schematically illustrating a configuration of a portable device in a portable device remote control system according to an exemplary embodiment of the present invention.

Referring to FIG. 3, the portable device 200 includes a second IP communications module 210, a mobile communications module 220, a terminal display unit 230, a terminal storage 240, a terminal controller 250 and a cable interface 260. Although, not illustrated, the portable device 200 may further include other elements, for example, an audio processing unit for processing an audio signal, a camera in case of adding a camera function, a Moving Picture Experts Group-1 Audio Layer 3 (MP3) processing unit regenerating a media file, a broadcasting reception module in case of adding a broadcasting reception function, a Global Positioning System (GPS) in case of adding a location estimate function and an input unit for the input of a user. The second IP communications module 210 is a communications module which may access the IP network. The second IP communications module 210 may be a wireless communications module that is portable which corresponds to the portable device 200. For example, the second IP communications module 210 may be various IP-based communications modules having portability, such as a Wireless Broadband (WiBro) module, a mobile Worldwide Interoperability for Microwave Access (Wi-Max) module, a wireless-LAN module, a Wideband Code Division Multiple Access (WCDMA) module and the like.

The second IP communications module 210 may have an address system connected with a name service server through the IP network. That is, the second IP communications module 210 may have a static IP address and registers the static IP address in the name service server, and may support the internet access terminal to search itself. The second IP communications module 210 having a static IP address forms an internet access terminal and a TCP communications channel. The second IP communications module 210 transmits the signal transmitted from the internet access terminal to the terminal controller 250, while being able to transmit screen information generated according to the operation of the portable device 200, the message reception information and the calling data, to the internet access terminal.

The mobile communications module 220 is a module which forms a communications channel with the mobile communication network. The mobile communications module 220 transmits the message received through the mobile communication network 400 to the terminal storage 240 through the terminal controller 250, may form a traffic channel with the portable device according to a request of the internet access terminal. That is, if the internet access terminal transmits a specific telephone number and message, the mobile communications module 220 may transmit the message received according to the control of the terminal controller 250 to the portable device having the telephone number which is transmitted together with the message in the form of a message service. Moreover, if the internet access terminal transmits a call request with the input of a specific telephone number, the mobile communications module 220 forms a communications channel with the mobile communication network, and may form a traffic channel with another portable device having the telephone number which is transmitted under the control of the terminal controller 250.

In other words, the mobile communications module 220 performs message transmission, formation of the communications channel for the voice communications and the communications channel for transmission of data including an image under control of the terminal controller 250. That is, the mobile communications module 220 forms a voice traffic channel, a data communications channel and an image communications channel between the mobile communication networks. For this, the mobile communications module 220 may include a wireless frequency transmitter which up-converts and amplifies the frequency of the transmitted signal, and a wireless frequency reception unit which low-noise amplifies and down-converts the received signal. The terminal display unit 230 displays the information which the internet access terminal input or the information provided to the internet access terminal as well as various menus of the portable device 200. That is, the terminal display unit 230 may provide various screens according to the use of each portable device, for example, a stand-by screen, a menu screen, a message writing screen, a call screen and the like.

If the internet access terminal transmits a signal for an instrument control, a message service control or call service control of the portable device 200, the terminal display unit 230 may output a screen corresponding to that the signal transmitted. In this process, the terminal controller 250 may transmit the above-described screen information to the internet access terminal. Moreover, in the above-described process, the terminal controller 250 may block power supplied to the display unit so that the output screen information is not revealed outside of the portable device 200. In the case where the internet access terminal connects to the portable device 200 through the IP network, probability that the internet connection terminal user is a portable device user is substantially high.

Accordingly, in the portable device 200, the screen information which is generated in a process where the internet connection terminal user uses the portable device is not output to the terminal display unit while operating or even if the screen information is output to the terminal display unit, the screen information is not output outside of the portable device 200 as a result of a supply of power being discontinued to the terminal display unit, for example, a light-off of the back-light of a Liquid Crystal Display (LCD). The terminal storage 240 may semi-permanently store the application program required for authentication between the internet access terminal 100 and the portable device 200, for example, an authentication protocol, as well as an application program necessary for a function operation of the portable device 200. If data are transceived between the portable device 200 and the other portable device or between the portable device and the internet access terminal, the terminal storage 240 buffers a corresponding data signal by a given magnitude. The terminal storage 240 may include a program area and a data area. The program area stores an OS which boots the portable device 200, an authentication protocol for authentication, an application program for the transmission of a message, an application program for supporting a voice call or an image call, and an application program necessary for other optional functions, for example, the camera function, the sound replay function, the image or moving picture replaying function and the like. If each of the above-described functions is activated according to a request of the user, the portable device 200 provides each function by using a corresponding application program under control of the controller 160. Moreover, the program area may further include an application program such as a web browser for accessing the IP network. The data area is an area in which data generated according to the use of the portable device 200 are stored. The data area may store user data relating to various optional functions, for example, a photographed image or a moving picture by the camera function, phone book data, audio data and information corresponding to a corresponding content or user data. More particularly, the data area may store the ID and the password which the user input for the authentication procedure, and may also store the message transmitted by the portable device. If the other portable device requests a call, the data area may store an absence call log accordingly.

The terminal controller 250 performs function control of each configuration of the above-described portable device 200, and generates and transmits to each configuration a control signal so that each configuration may normally operate, and may control the signal flows transceived between each configuration. More particularly, the terminal controller 250 may control to receive a signal relating to the instrument control request of the internet access terminal, a message service request and a call request. The terminal controller 250 may activate the application program according to the signal, and then transmit data generated according to corresponding application program activation to the internet access terminal.

In more detail, if the internet access terminal transmits an access request based on the IP network, the terminal controller 250 transmits the authentication request to the internet access terminal. If the internet access terminal inputs a correct ID and password such that the authentication is completed, the terminal controller 250 controls the second IP communications module 210 to transmit to the internet access terminal the screen information which is set to be output to the terminal display unit 230 of the portable device 200, for example, the screen information of the stand-by screen.

Thereafter, the terminal controller 250 controls the second IP communications module 210 to activate a corresponding application program according to a signal which the internet access terminal transmits, for example, a menu activation request signal and a signal for the selection of a specific item among menu items, for example, a message confirmation request message, a call log confirmation request signal, a phone book confirmation request message and the like. The terminal controller 250 also controls the second IP communication module 210 to transmit the screen information which is output accordingly to the internet access terminal. That is, the terminal controller 250 may control the second IP communications module 210 to transmit to the internet access terminal reception message list screen information, message confirmation screen information, call log screen information, phone book screen information and the like.

Moreover, when the internet access terminal intends to use the message service function of the portable device 200, the terminal controller 250 converts the telephone number transmitted from the internet access terminal or the prepared message in order to correspond to for the message service application program of the portable device. The terminal controller 250 may control to transmit the converted message to the other portable device having the telephone number transmitted through the mobile communication network.

Here, the internet access terminal operates an emulator which may control each service of the portable device 200. Synchronized with the operation of the emulator, the terminal controller 250 may provide each service of the portable device. In case the internet access terminal intends to use the call service function of the portable device 200, the terminal controller 250 may form the traffic channel with the other portable device through the mobile communication network having a corresponding telephone number, according to the telephone number and the call request signal that is transmitted from the internet access terminal.

Thereafter, the terminal controller 250 receives the voice signal or the screen information transmitted by the internet access terminal through the IP network, and converts the voice signal or the screen information into a type of data which may be transmitted through the mobile communication network. The terminal controller 250 transmits the converted voice signal or screen information to the other portable device through the mobile communication network, while converting the voice signal or screen information transmitted from the other portable device into a type of data which may be transmitted through the IP network. The terminal controller 250 controls to transmit data converted from the voice signal or the screen information of the other portable device to the internet access terminal through the IP network.

As described above, after forming a TCP communications channel with the portable device based on the IP network, the remote control system of the portable device may perform various instrument control of the portable device, the message service function control, and the call service function control by operating the emulator of the internet access terminal. Accordingly, the control of the portable device may be performed through the IP network which does not require additional costs. In the meantime, the cable interface 260 is an instrument which enables the portable device 200 to connect with an additional internet access terminal without the second IP communications module 210, that is, the internet accessible terminal which may be combined with the portable device 200 in a region where the portable device 200 is positioned, through a cable.

For this, it is preferable that the portable device 200 prepares a cable interface accessible to the internet access terminal through a cable, and stores an application program enabling to communicate with an additional internet access terminal through the cable interface. When the portable device 200 connects through an additional port, for example, a Universal Serial Bus (USB) port, the additional internet access terminal recognizes the portable device 200 as an external device and may activate the application program for the operation of the portable device 200. The portable device 200 may transmit an instrument control authority and various data stored in the instrument to the additional internet access terminal, corresponding to the operation of the application program of the additional internet access terminal. In this process, the portable device 200 and the additional internet access terminal is able to perform the ID and the password transceive process for performing a specific authentication for security support of the user.

The configuration of the portable device remote control system according to an exemplary embodiment of the present invention was described above. Hereinafter, the remote control method of the portable device based on the above-described portable device remote control system will be illustrated.

Figure 4:
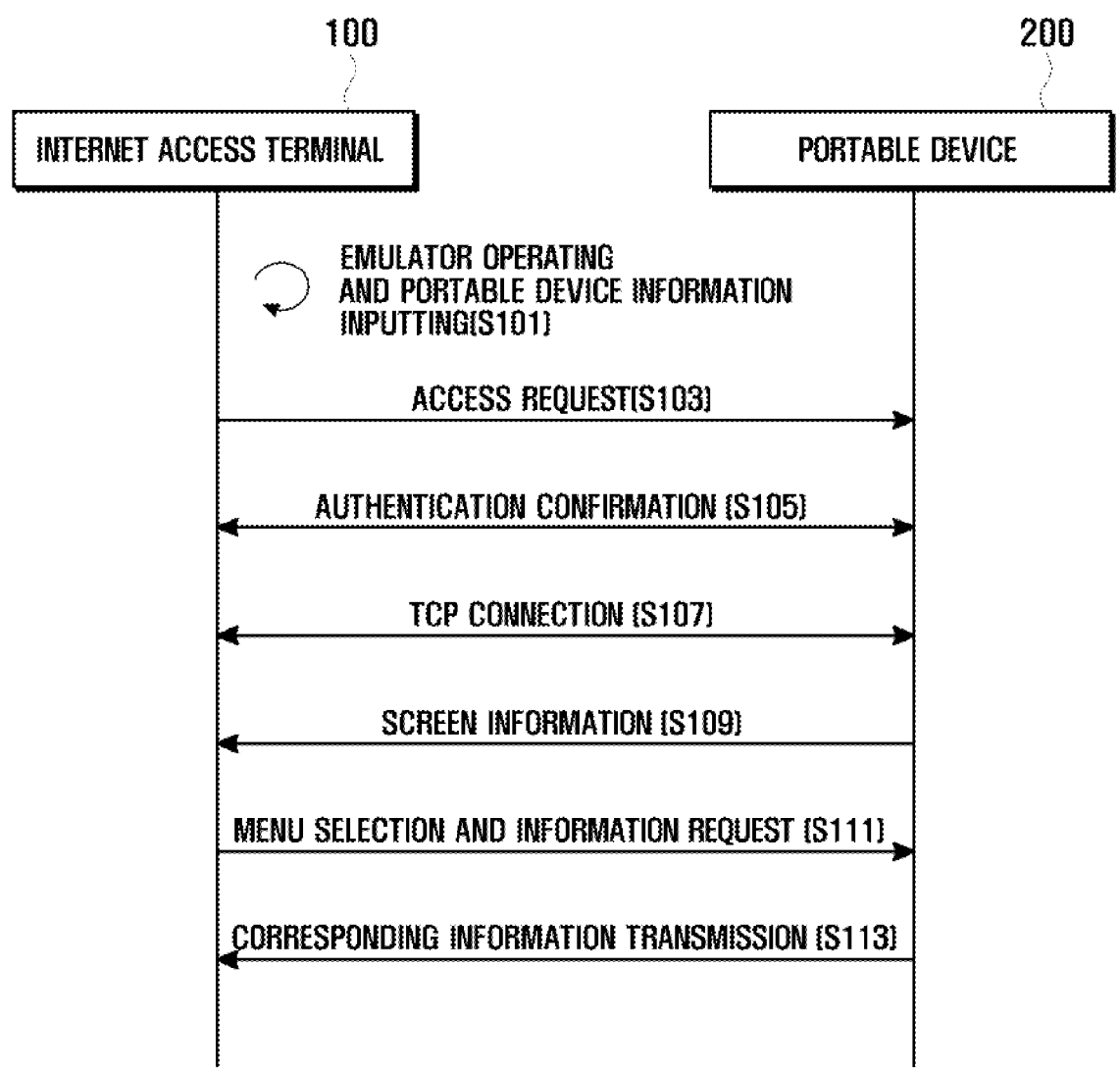
FIG. 4 is a signal flow diagram illustrating an instrument control process of a portable device remote control method according to an exemplary embodiment of the present invention.

FIG. 4 is a signal flow diagram illustrating an instrument control process of a portable device remote control method according to an exemplary embodiment of the present invention.

Referring to FIG. 4, the internet access terminal 100 supplies power and completes a booting operation. In this process, the internet access terminal 100 supplies the power to a first IP communications module to connect to an IP network, and initializes a first internet protocol communications module. In the meantime, the portable device 200 is activated as the power is already supplied, so that it may have a sleep state. When the above-described initialization process is completed, the internet access terminal 100 activates an emulator for the control of the portable device 200 according to the input of user in step S101, and inputs the information of the portable device 200.

That is, the internet access terminal 100 activates the emulator stored in the PC storage 140 and outputs the information of the portable device 200 to the PC display unit 130. The internet access terminal 100 may receive the information of the portable device 200 according to an input of a user from the PC input unit to search the portable device 200 based on the IP network. Here, the portable device information corresponds to a unique IP address of the portable device 200, and may include a telephone number or a user name of the portable device. When the internet access terminal intends to search the portable device 200 with the telephone number or the user name of the portable device 200, the telephone number or the user name of the portable device 200 should be unique, and should be registered in a name service server while being mapped to a static IP address.

Here, the telephone number or the user name of the portable device is information that is used to search the portable device 200 by the internet access terminal 100 and may be various characters or signs which are defined in advance. For this, the portable device 200 accesses the IP network in advance and may perform the IP address registration in the name service server. The portable device 200 may register a domain name corresponding to the IP address, that is, the telephone number or the user name, in the IP address registration. Here, the name service server should manage a specific IP address to be mapped to the unique telephone number or the user name. The internet access terminal 100 then transmits the information input for the search of the portable device 200 to the IP network.

The IP network then confirms whether the corresponding portable device is in the name service server and transmits the corresponding IP address to the internet access terminal if the corresponding portable device exists. In this process, if the corresponding portable device search cannot be performed, the IP network may transmit a message corresponding to a non-execution of search to the internet access terminal. If the internet access terminal 100 obtains the unique IP address of the portable device 200, the internet access terminal 100 performs an access request to the portable device 200 having a corresponding IP address in step S103.

If the portable device 200 receives the access request from the internet access terminal 100, the portable device 200 may control to perform an authentication confirmation process to confirm whether the internet access terminal 100 is an accessible terminal in step S105. That is, in step S105, the portable device 200 transmits an authentication information request to the internet access terminal 100, and the internet access terminal 100 transmits a proper ID and password to the portable device 200. In this process, the portable device 200 confirms whether the transceived ID and password are identical with the ID and password set up in advance. In case of normal authentication information, the portable device proceeds to step S107 and the TCP based communications channel may be formed between the internet access terminal 100 and the portable device 200. If the TCP based communications channel is formed, the portable device 200 may transmit screen information which may be presently output to the terminal display unit to the internet access terminal 100 in step S109.

In this process, in a state where the portable terminal 200 deactivates the terminal display unit, the portable device 200 may control to transmit only the screen information which should be output to the internet access terminal 100. Then, the internet access terminal 100 transmits a signal for a request of information related to a menu selection and specific menu to the portable device 200 based on the screen information which the portable device 200 provides in step S111.

The portable device 200 activates the application program corresponding to the request signal transmitted by the internet access terminal 100, and transmits the screen information according to the activation of a corresponding application program to the internet access terminal 100 in step S113. In this process, the internet access terminal 100 and the portable device 200 may transceive data based on the IP network which does not require additional costs.

Figure 5:
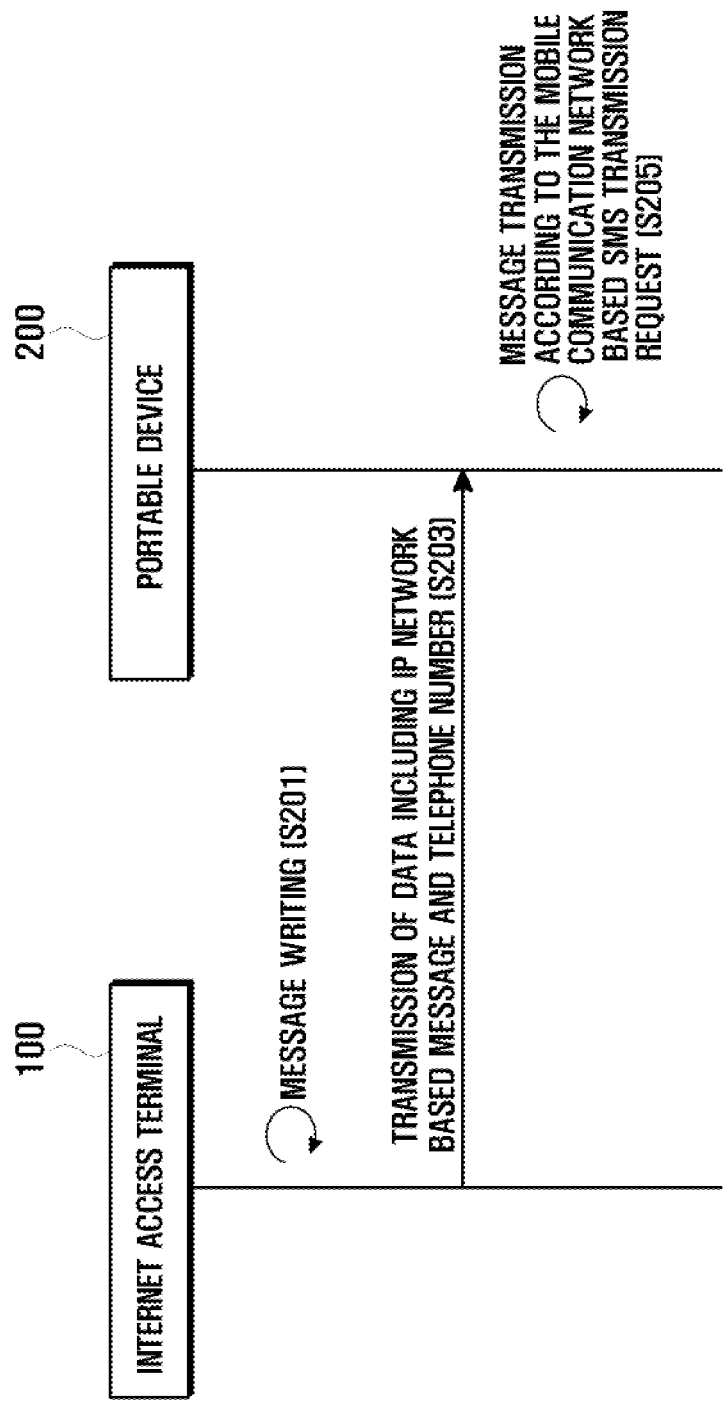
FIG. 5 is a signal flow diagram illustrating a message control process of a portable device remote control method according to an exemplary embodiment of the present invention.

FIG. 5 is a signal flow diagram illustrating a message control process of a portable device remote control method according to an exemplary embodiment of the present invention.

In an exemplary implementation, it is assumed that a TCP based communications channel is formed between an internet access terminal 100 and a portable device 200 by using an IP network, and the internet access terminal 100 operates an emulator for control of the portable device 200. Referring to FIG. 5, in the portable device message control process, the internet access terminal 100 performs message writing in step S201.

For this, the internet access terminal 100 generates a signal selecting an item for the message writing among menu items of the portable device 200 and may transmit the signal to the portable device 200. If the portable device 200 receives a menu item activation request signal and a signal for selecting an item for the message writing among menu items from the internet access terminal 100, screen information outputting the menu item may be transmitted to the internet access terminal 100.

The portable device 200 activates a message writing application program corresponding to the item selection for the writing message among the menu items and transmits the screen information of the message writing window to the internet access terminal 100. Then, the internet access terminal 100 outputs the message writing window corresponding to the message writing window of the portable device to a PC display unit, and may write a message including a character, number or multimedia file according to an input of a user. The internet access terminal 100 transmits data including a message prepared through an IP network based TCP communications channel and a telephone number of a portable device that received the message to the portable device 200 in step S203.

In more detail, if the message writing is completed, the internet access terminal 100 provides an input window for inputting the telephone number which received the message, and transmits the telephone number which the user input to a PC controller through the input window, while outputting the message writing window to the PC display unit. In this process, the internet access terminal 100 may request phone book data to the portable device 200, and may request the screen information which activated the phone book. For example, the internet access terminal 100 transmits a signal for the phone book activation to the portable device 200, and the portable device 200 may transmit the screen information which activated the phone book according to the signal transmitted to the internet access terminal 100. The internet access terminal 100 may then transmit a signal selecting a particular telephone number in the activated screen information to the portable device 200, and the portable device 200 may determine the telephone number of another portable device which transmitted the message based on the selection signal which the internet access terminal 100 transmitted.

The portable device 200 completes the message writing based on the message and the telephone number received from the internet access terminal 100, and transmits the written message to the other portable device through the mobile communication network in step S205. For this, the portable device 200 forms the communications channel with the mobile communication network 400, and transmits the written message to a message service center with the telephone number. Then, the message service center may transmit the received message to another corresponding portable device. As described above, in a process where the internet access terminal connects to the IP network and performs instrument control of the portable device 200, the portable device remote control method may transmit a message to the other portable device by using the message service function of the portable device. At this time, required cost includes the cost of message service that the portable device transmits to the other portable device.

Figure 6:
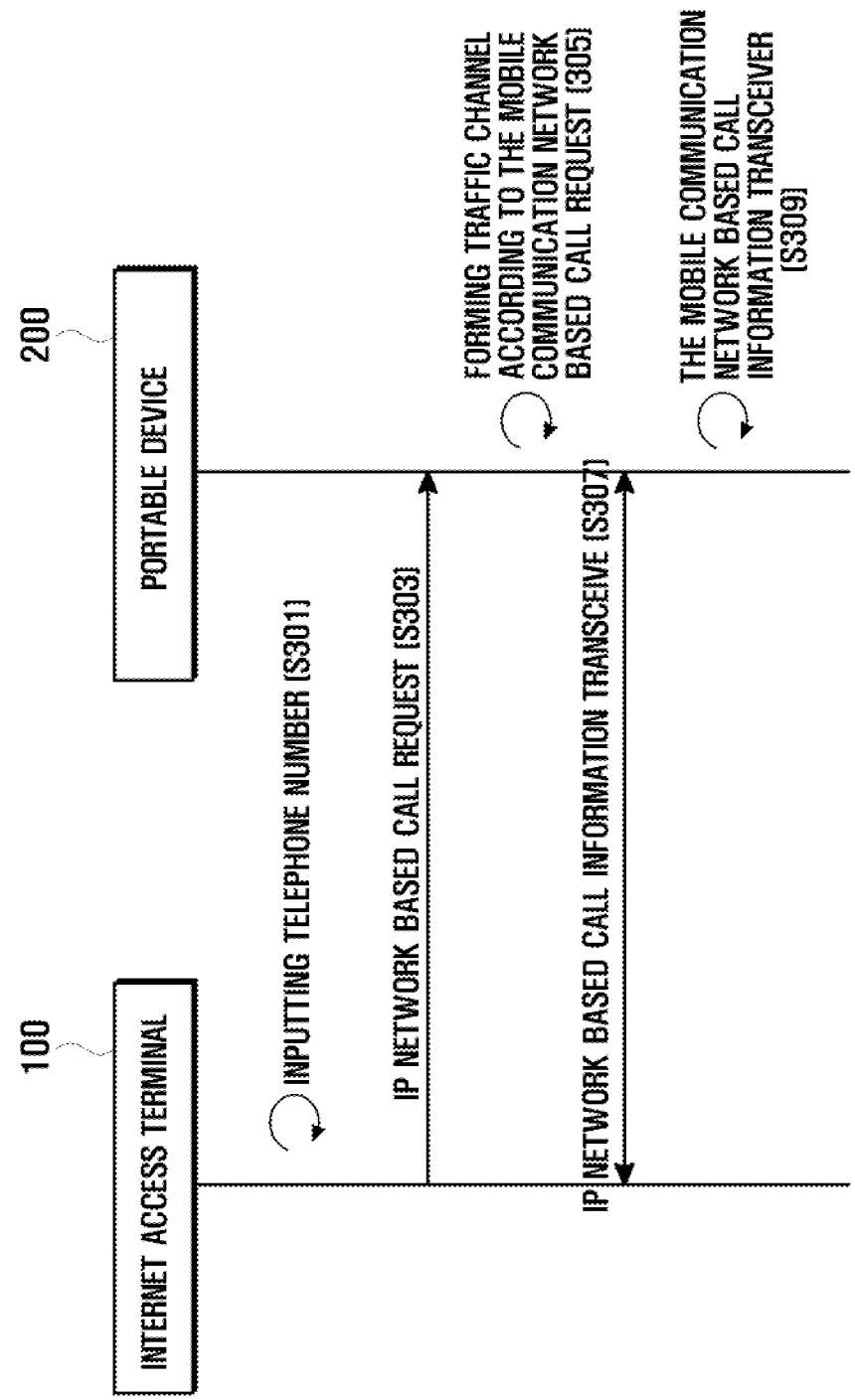
FIG. 6 is a signal flow diagram illustrating a call service process of a portable device remote control method according to an exemplary embodiment of the present invention.

FIG. 6 is a signal flow diagram illustrating a call service operation of a portable device remote control method according to an exemplary embodiment of the present invention.

Hereinafter, it is assumed that a TCP based communications channel is formed between an internet access terminal 100 and a portable device 200 by using an IP network, and the internet access terminal 100 operates an emulator for control of the portable device 200. Referring to FIG. 6, in the portable device call service operation method, the internet access terminal 100 receives a telephone number from a PC input unit according to an input of a user in step S301.

In this process, the internet access terminal 100 may directly receive the telephone number with a number from the PC input unit, such as a keyboard or a touch pad. Moreover, after the internet access terminal 100 transmits a phone book activation request signal to the portable device 200 and when the portable device 200 transmits screen information which activates the phone book, the internet access terminal 100 outputs the screen information to the PC display unit and transmits a signal designating a particular telephone number among an output phone book to the portable device 200. The internet access terminal 100 may transmit a signal requesting a call with the portable device including the input telephone number to the portable device through the IP network based TCP communications channel in step S303.

If the portable device 200 receives a signal which performs the call request from the internet access terminal 100 by using the particular telephone number, the portable device 200 performs traffic channel formation according to the call request based on a mobile communication network in step S305.

In detail, the portable device 200 receives a telephone number or a signal indicating the telephone number among data which the internet access terminal 100 transmitted, and forms the traffic channel with the mobile communication network to form the traffic channel with another portable device corresponding to the telephone number. While transmitting the telephone number to the mobile communications service provider through the mobile communication network, the portable device 200 transmits a request of a telephone call with the portable device. When the mobile communications service provider searches the other portable device which is connected to the mobile communication network and transmits the information to the portable device, the portable device 200 forms the traffic channel with the other portable device. In this process, the internet access terminal 100 may request voice communications or image communication. Accordingly the portable device may form a voice traffic channel or an image communications channel with the other portable device. Thereafter, the portable device 200 receives the voice signal or the image signal transmitted by the other portable device through the mobile communication network, and performs data conversion to transmit through the IP network. When the data conversion is completed, the portable device 200 transmits corresponding data to the internet access terminal 100 through the IP network based TCP communications channel. The internet access terminal 100 receives and demodulates corresponding data from the portable device 200 and outputs the voice signal through a speaker, while outputting the image signal through the PC display unit.

In the meantime, the internet access terminal 100 may prepare a camera, or a camcorder and a microphone. After collecting the voice signal and the image signal, the internet access terminal 100 may transmit the voice signal and the image signal to the portable device 200. If the portable device 200 receives the voice signal or the image signal from the internet access terminal 100 through the TCP communications channel, the portable device 200 performs data conversion and converts data into a type of data which may be transmitted through the mobile communication network. Thereafter, the portable device 200 is able to transmit the data to the other portable device.

That is, while converting the data received through the second IP communications module into a type of data which may be transmitted through the mobile communications module, the portable device 200 may perform a task of converting the data received from the mobile communications module into a type of data which may be transmitted through the second IP communications module. When the internet access terminal 100 and the portable device 200 transceive the IP network based calling data in step S307, the portable device 200 transceives the mobile communication network based calling data in step S309.

Substantially, step S307 and step S309 are performed in real-time, so that each step may be repetitively performed in a process of using the call service. As illustrated in the above, in the remote control method of the portable device, the internet access terminal 100 transmits data to the portable device 200 through the IP network or receives data from the portable device 200 without additional cost. Therefore, the remote control method of the portable device 200 only requires cost which is generated when the portable device uses the mobile communication network.

That is, the remote control system and method of the portable device according to an exemplary embodiment of the present invention may connect to the IP network and search a portable device by using an internet access terminal, without using an additional portable device or acquiring additional costs, and may perform the instrument control of the searched portable device, and the message confirmation, transceive control and the call transceive control process.

Figure 7:
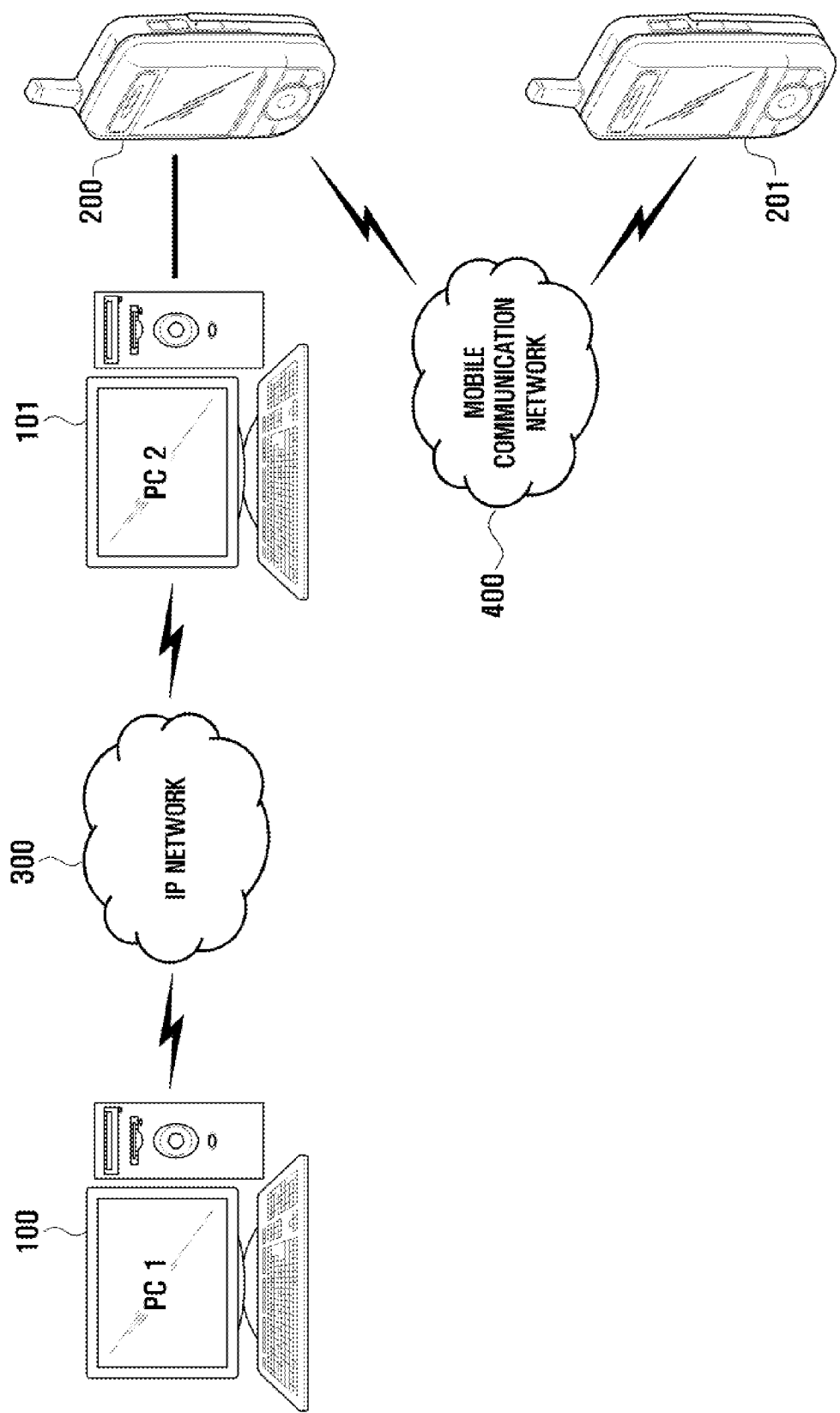
FIG. 7 schematically illustrates a configuration of a portable device remote control system according to an exemplary embodiment of the present invention.

FIG. 7 schematically illustrates a configuration of a remote control system of a portable device according to an exemplary embodiment of the present invention.

Referring to FIG. 7, the remote control system of the portable device includes a first internet access terminal 100, an IP network 300, a second internet access terminal 101, a first portable device 200, a mobile communication network 400 and a second portable device 201. Here, the second portable device 201 is an element for illustrating a message service function and a call service function of the first portable device 200. The first portable device 200 prepares a cable interface, and by using the call interface, the first portable device 200 may connect to the second internet access terminal 101. At this time, the second internet access terminal 101 and the first portable device 200 prepare, instead of the cable interface, a wireless local communications module, for example, a Bluetooth communications module, and may perform communication.

However, battery consumption of the portable device 200 for an operation of a wireless local communications module, and preparation of an additional wireless local communications module may be non-efficient in comparison with a cable interface due to an increment of production costs. Accordingly, the first portable device 200 may connect to the second internet access terminal 101 through the cable interface, and a battery charge may be additionally performed through the cable interface which is a connecting point to the second internet access terminal 101.

In the remote control system of the portable device, the first internet access terminal 100 searches the second internet access terminal 101 so that the IP network based TCP communications channel may be formed. For this, the second internet access terminal 101 registers its own IP address in the IP network, and a name service server may be added for support of the IP address search service. If the first internet access terminal 100 forms a searched TCP communications channel with the second internet access terminal 101, the first internet access terminal 101 may perform an authentication procedure for control acquisition with the second internet access terminal 101. If authentication is completed, the first internet access terminal 100 may perform control of the first portable device 200 which is connected to the second internet access terminal 101. In this process, the portable device 200 may perform an additional authentication procedure. Here, the first internet access terminal 100 communicates with the second internet access terminal 101 based on the TCP communications channel, and communicates with the first portable device 200 through the TCP communications channel and cable communication. At this time, the second internet access terminal 101 may convert data transceived by the first portable device 200 for communications with the portable device 200 into data for the cable communications. Substantially, if data are transceived through the cable, the controller of the second internet access terminal 101 directly communicates with the controller of the portable device so that an additional data conversion may not be generated. If the portable device 200 receives data from the second internet access terminal 101, the portable device 200 performs data conversion to transmit the converted data through the mobile communication network, and may transmit the converted data to another portable device through the mobile communications module.

In the meantime, in the remote control system of the portable device, if the first internet access terminal 100 intends to control the first portable device 200 and perform voice communications or image communications with the second portable device 201, the first internet access terminal 100 transceives the data through the IP network 300, the second internet access terminal 101, the first portable device 200 and the mobile communication network 400. Among devices that the first internet access terminal 100 communicates with, the first portable device 200, the IP network 300 and the cable interface does not require additional costs. Therefore, only the cost of using the mobile communication network 400 is required.

As described above, in the remote control system of the portable device according to an exemplary embodiment of the present invention, the first portable device does not prepare an additional second IP communications module. The first portable device connects to the second internet access terminal through the cable interface, so that, without the second IP communications module, the instrument control, the message service use and the call service use of the portable device are available.

Figure 8:
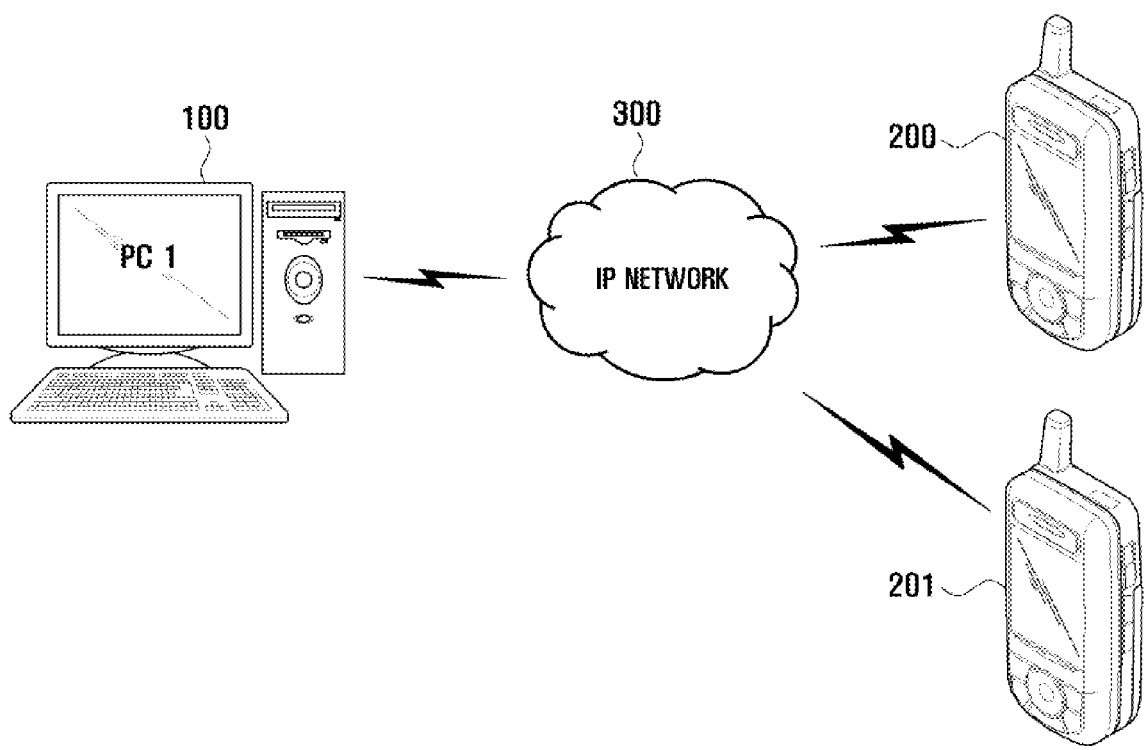
FIG. 8 schematically illustrates a configuration of a portable device remote control system according to an exemplary embodiment of the present invention.

FIG. 8 schematically illustrates a configuration of a remote control system of a portable device according to an exemplary embodiment of the present invention.

Referring to FIG. 8, the remote control system of the portable device includes a first internet access terminal 100, an IP network 300, a first portable device 200 and a second portable device 201. In the remote control system of the portable device, the first internet access terminal 100 may form a TCP communications channel with the first portable device 200 based on the IP network 300.

Since the communications path formation that the first internet access terminal 100 forms the TCP communications channel with the first portable device 200 based on the IP network 300 is identical with the configuration illustrated in FIG. 1, a detailed description is omitted. In the meantime, the remote control system of the portable device may support the first internet access terminal 100 to communicate with the second portable device 201 by using the first portable device 200. For this, the first portable device 200 and the second portable device 201 should prepare the IP communications module which may directly connect to the IP network 300. The first portable device 200 and the second portable device 201 should support the internet access terminal 100 to search the first portable device 200, or support the first portable device 200 to search the second portable device 201 in the IP network. That is, the first portable device 200 and the second portable device 201 should prepare a unique IP address, respectively, and register the unique IP address in the IP network 300. As described above, the first portable device 200 and the second portable device 201 may register a static IP address in the name service server which the IP network 300 provides. In the static IP address registering process, the first portable device 200 and the second portable device 201 may register the address which is mapped to the static IP address, for example, the telephone number or the user name. Here, the name service server which may be inherent may manage the telephone number or the user name mapped to the static IP address. When the pre-registration process is completed, the internet access terminal 100 may transmit the telephone number for searching the first portable device 200 to the IP network 300, and may form the TCP communications channel based on a corresponding IP address, if the internet access terminal detects the static IP address of the first portable device 200. The voice communications channel or the image communications channel with the second portable device 201 may also be formed by using the first portable device 200.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of remote control for a portable device, the method comprising:
   registering, by a portable device, an Internet Protocol (IP) address in an IP network;
   forming a transport control protocol based communications channel with an internet access terminal based on the IP network and the IP address;
   receiving a control signal for activating an application program of the portable device from the internet access terminal based on the transport control protocol;
   activating, by the portable device, the application program associated with a communication service according to the control signal;
   receiving a function request signal for controlling a communication function of the activated application program on the portable device from the internet access terminal;
   receiving information of another portable device related to the communication function from the internet access terminal;
   executing the communication function based on the information of the other portable device on the portable device according to the function request signal; and
   transmitting, by the portable device, screen information respectively corresponding to the activated application program and the executed communication function of the activated application program to the internet access terminal,
   wherein the function of the activated application comprises at least one of a message service application program or a call service application program, and
   wherein the activating of the application program comprises:
      activating a message service application program, if the portable device receives the message service activation request signal,
      receiving a message writing request signal from the internet access terminal, by the portable device,
      activating a message writing window according to the message writing request signal, by the portable device, and
      receiving a text message and a telephone number of message transmission from the internet access terminal and writing a message, by the portable device.

2. The method of claim 1, wherein, in receiving the control signal, the internet access terminal transmits at least one of a call log activation request signal, a phone book activation request signal, a message service activation request signal and a call service activation request signal to the portable device.

3. The method of claim 2, wherein the screen information comprises at least one of screen information according to the call log activation of the portable device and screen information according to the phone book activation of the portable device.

4. The method of claim 2, wherein the activating of the application program
further comprises activating a reception message inbox according to the activation of the message service application program, by the portable device.

5. The method of claim 4, wherein the transmitting the screen information comprises:
transmitting screen information corresponding to a reception message list according to the activation of the reception message inbox from the portable device, by the internet access terminal; and
transmitting screen information according to a specific reception message confirmation among the reception message list from the portable device, by the internet access terminal.

6. The method of claim 1, wherein the transmitting of the screen information comprises:
transmitting screen information of the message writing window to the internet access terminal; and
transmitting screen information of the message transmission to the internet access terminal.

7. A remote control system of a portable device, the system comprising:
an Internet Protocol (IP) network configured to support an IP based communications channel;
a portable device configured to:
register an IP address in the IP network,
activate an application program associated with a communication service according to a control signal which is received from an internet access terminal,
receive information of another portable device related to the a communication function from the internet access terminal,
execute a communication function based on the information of the other portable device according to a function request signal which is received from the internet access terminal, and
transmit screen information respectively corresponding to the activated application program and an executed communication function of the activated application program to the internet access terminal; and
an internet access terminal configured to:
form a transport control protocol communications channel with the portable device based on the IP network,
transmit the signal for activating the application program, and
control the communication function of the activated application program on the portable device,
wherein the internet access terminal is further configured to transmit a signal for activating the portable device, and to receive and output screen information which is received from the portable device,
wherein the function of the activated application comprises at least one of a message service application program or a call service application program, and
wherein the portable device comprises:
a second IP network interface configured to connect to the IP network and to form a transport control protocol based communications channel with the internet access terminal,
a mobile communications transceiver configured to:
connect to a mobile communication network,
transmit a signal received from the internet access terminal to the other portable device, and
receive a signal which the other portable device transmits, and a second controller configured to:
convert a signal received from the internet access terminal into a type of data which can be transmitted through the mobile communication network, and
convert a signal received from the other portable device into a type of data which can be transmitted through the IP network.

8. The system of claim 7, wherein the internet access terminal comprises:
a first IP network interface configured to:
transmit a signal input to the internet access terminal to the portable device through the IP network, and
receive screen information corresponding to request signals from the portable device;
a first display configured to output the received screen information; and
a first controller configured to control to:
receive at least one of a signal requesting call log data stored in the portable device, a phone book activation request signal of the portable device, a message service activation request signal of the portable device and a call service activation request signal of the portable device,
transmit the request signals input to the internet access terminal to the portable device through the first IP network interface, and
output the screen information received from the portable device.

9. The system of claim 8, further comprising:
a speaker configured to output a voice signal received from the portable device according to the call service activation request signal; and
a microphone configured to collect the voice signal, by the internet access terminal, and to transmit the voice signal to the first controller.

10. The system of claim 8, wherein the first display is further configured to output at least one of:
screen information corresponding to a reception message list according to the activation of a reception message inbox received from the portable device according to the message service activation request signal,
screen information received from the portable device according to a specific reception message confirmation among the received message list,
screen information received from the portable device according to the activation of a message writing window, and
screen information of a message transmission received from the portable device.

11. The system of claim 8, wherein the first controller is further configured to:
receive a telephone number and a call request signal input to the internet access terminal and transmit the telephone number and the call request signal to the portable device, and
receive at least one signal among a voice signal and an image signal received from the other portable device and output the at least one signal if the portable device forms a mobile communications channel with the other portable device corresponding to the telephone number based on the mobile communication network.

12. The system of claim 8, wherein, if the call service activation request signal is received from the internet access terminal, the portable device is further configured to activate a call service application program, and a telephone number and a call request signal are received from the internet access terminal, and if the telephone number and the call request signal is received from the internet access terminal, after forming a mobile communications channel with the other portable device corresponding to the telephone number based on a mobile communication network, at least one of a voice signal and an image signal received from the other portable device is transmitted to the internet access terminal, and at least one of a voice signal and an image signal received from the internet access terminal is transmitted to the other portable device.

13. The system of claim 12, wherein the portable device is configured to convert a signal received from the internet access terminal into a type of data which can be transmitted through the mobile communication network, and to convert a signal received from the other portable device into a type of data which can be transmitted through the IP network.

14. A method of remote control for a portable device, the method comprising:

registering, by a portable device, an Internet Protocol (IP) address in an IP network;

forming a transport control protocol based communications channel with an internet access terminal based on the IP network and the IP address;

receiving a control signal for activating an application program of the portable device from the internet access terminal based on the transport control protocol;

activating, by the portable device, the application program associated with a communication service according to the control signal;

receiving a function request signal for controlling a communication function of the activated application program on the portable device from the internet access terminal;

receiving information of another portable device related to the communication function from the internet access terminal;

executing the communication function based on the information of the other portable device on the portable device according to the function request signal; and transmitting, by the portable device, screen information respectively corresponding to the activated application program and the executed communication function of the activated application program to the internet access terminal, wherein the function of the activated application comprises at least one of a message service application program or a call service application program, and wherein the transmitting of the screen information comprises:

activating a call service application program, if the portable device receives the call service activation request signal;

forming a mobile communications channel with the other portable device corresponding to the telephone number based on a mobile communication network, if the portable device receives a telephone number and a call request signal from the internet access terminal; and transmitting at least one of a voice signal and an image signal received from the other portable device to the internet access terminal, or transmitting at least one of a voice signal and an image signal received from the internet access terminal to the other portable device, by the portable device.

15. The method of claim 14, wherein the transmitting of the at least one voice signal and image signal comprises:

converting a signal received from the internet access terminal into a type of data which can be transmitted through the mobile communication network, by the portable device; and converting a signal received from the other portable device into a type of data which can be transmitted through the IP network, by the portable device.

* * * * *